United States Patent Office 2,991,261
Patented July 4, 1961

2,991,261
METHOD FOR PREPARING A POLY-
DIOLEFIN LATEX
Richard Louia Ray and Edward Allen Hunter, Baton Rouge, La., assignors to Esso Research and Engineering Company, a corporation of Delaware
No Drawing. Filed Sept. 30, 1958, Ser. No. 764,216
7 Claims. (Cl. 260—23.7)

This invention relates to a latex and more particularly to an improved method for preparing a latex from a polydiolefin.

It is known in the art to polymerize a conjugated diolefin in the presence of an alkali metal catalyst, e.g., sodium. However, in the past it was necessary to remove the reactive sodium which remains in the polymer before a latex was formed. Otherwise, this impurity interferes with use of the latex. For example, if cans and similar items were coated with the latex and flame cured, the sodium would oxidize and cause surface imperfections thereon.

Previously, expensive operations, e.g., filtration with acid clay, or treatment with acetic acid, have been employed to remove the available sodium and/or the neutralization products therefrom before the polymer is emulsified. It has now been discovered that a polydiolefin latex can be prepared without removing available sodium and/or neutralization products. Thus, in accordance with one embodiment of this invention a conjugated diolefin is polymerized in the presence of an alkali metal catalyst. The available catalyst remaining in the polymer is subsequently in situ reacted with a $C_{10}$ to $C_{20}$ organic acid or a $C_{10}$ to $C_{24}$ half ester of a di- or polybasic acid, e.g., sulfuric acid. The product therefrom is the emulsifying agent, which upon the addition of water and agitation provides the polydiolefin latex.

Polymeric oils included in this invention are prepared in the presence of an alkali metal catalyst from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc., may also be used.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 wt. percent (based on sodium) of an alcohol such as methanol, isopropanol, or an amyl alcohol in order to overcome the initial induction period. The resulting product may vary in viscosity from 0.15 to 20 poises, and may be altered as desired for use in the present invention. The preparation of this oil is described in U.S. Patent 2,762,851 which is incorporated herein by reference.

In accordance with this invention there is generally about 0.01 to 5 parts of available catalyst, e.g., sodium, remaining in 100 parts by weight of the polydiolefin oil. This available catalyst is subsequently reacted in situ with 1 to 50 parts, preferably 3 to 10 parts, of an organic acid or acidic half ester based on 100 parts of polymer. The organic acids within the purview of this invention are $C_{10}$ to $C_{20}$ alkyl carboxylic acids, e.g., oleic, lauric, palmetic, and the like. Lower fatty acids, e.g., acetic are inoperative since the alkali metal salts therefrom will not emulsify the polymer and water. The esters within the scope of this invention are sulfated esters selected from the group consisting of $C_9$ to $C_{20}$ alkyl hydrogen sulfates, e.g., lauryl hydrogen sulfate; alkyl aromatic sulfonates, e.g., dodecyl benzene sulfonic acid; and sulfated condensation products of alkyl phenols with ethylene oxide.

To the polydiolefin oil and alkali metal salt, e.g., sodium oleate, sodium lauryl sulfate, or the like, is added 30 to 900 parts of water based on 100 parts of polymer. Upon agitation a latex is formed.

Thus in accordance with this invention the end product is a stable, homogeneous latex. It has been prepared from a polydiolefin which has been polymerized in the presence of an alkali metal catalyst. The available catalyst in the polymer does not have to be neutralized and the products therefrom do not have to be removed. Therefore, expensive operations, which were previously required to produce a satisfactory latex, have been eliminated.

The following examples are submitted to illustrate and not to limit this invention.

Example I

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene 100 K.B. value, n-heptane 25.4 K.B. value).

[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. A crude product was formed in which some of the solvent was removed by stripping to give a product of 40 wt. percent NVM.

One hundred parts by weight of this polymer oil containing 40 parts polymer and 0.013 part of available sodium was reacted with 15.95 parts of oleic acid to yield sodium oleate in situ. Water, 125 parts based on 100 parts of polymer, was subsequently added and the mixture was agitated to provide a water-in-oil (high viscosity) system and then an oil-in-water (low viscosity) system. The resulting latex, containing 24.5 wt. percent polymer, was stable with no sign of creaming or oiling out.

Example II

A 98% NVM polydiolefin oil was prepared in a similar procedure described in Example I. Oleic acid, 49.5 parts thereof, was reacted with 0.0325 part of available sodium which remained in 100 parts by weight of the polymeric oil. One hundred parts of water per 100 parts of polymer were added to the polymer and sodium oleate reaction product. Continuous agitation produced a latex which gave no indication of oiling out. The latex contained 40 wt. percent polymer.

*Example III*

250 parts of the polydiolefin oil of Example I, 40% NVM, was prepared containing 0.0325 part of available sodium per 100 parts by weight of polymer. The sodium therein was reacted in situ with 5.5 parts of oleic acid based on 100 parts of polymer. To this reaction mixture was added 125 parts of water per 100 parts of polymer and upon subsequent stirring, an homogeneous latex was formed containing 26.3 weight percent polymer.

*Example IV*

The polydiolefin oil of Example I was prepared, 40% NVM, containing 0.0325 part of available sodium per 100 parts by weight of polymer. Latex A was formed by reacting the sodium, therein, in situ with 5.5 parts of lauryl hydrogen sulfate per 100 parts of polymer; latex B was formed by reacting 5.5 parts of dodecyl benzene sulfonic acid with another batch of the polydiolefin oil. Latex C was similarly prepared by reacting the polydiolefin oil with 5.5 parts of another compound, the sulfated condensation product of nonyl phenol with five ethylene oxide residues. A final stable latex, A, B, and C, would be provided by adding 125 parts of water to each of the reaction mixtures above in conjunction with continuous agitation.

Having described the general nature and specific embodiments of the invention, the true scope is now particularly pointed out in the appended claims.

What is claimed is:

1. An improved method for preparing a polydiolefin latex which comprises providing 100 parts of a liquid polymer of a $C_4$ to $C_6$ conjugated diolefin in the presence of an alkali metal catalyst; reacting 0.01 to 5 parts of the available alkali metal catalyst remaining in the polymer in situ with a $C_{10}$ to $C_{24}$ half ester selected from the group consisting of lauryl hydrogen sulfate, dodecyl benzene sulfonic acid, and the sulfated condensation product of nonyl phenol with five ethylene oxide residues; adding 30 to 900 parts of water to said polymer and said reaction product to provide a stable, homogeneous latex.

2. The method according to claim 1 in which the polymer is the homopolymer of butadiene.

3. The method according to claim 1 in which the polymer is a copolymer of 75 to 85% butadiene with 25 to 15% styrene.

4. The method according to claim 1 in which the half ester is lauryl hydrogen sulfate.

5. The method according to claim 1 in which the half ester is dodecyl benzene sulfonic acid.

6. The method according to claim 1 in which the half ester is the sulfated condensation product of nonyl phenol with five ethylene oxide residues.

7. The method according to claim 1 in which the catalyst is sodium.

References Cited in the file of this patent

UNITED STATES PATENTS 2,568,950     Crouch _____ Sept. 25, 1951

OTHER REFERENCES

Schwartz et al.: Surface Active Agents and Detergents, pages 671–684, vol. II, Interscience (1958).